(12) United States Patent
Waxman

(10) Patent No.: US 7,986,676 B2
(45) Date of Patent: Jul. 26, 2011

(54) TECHNIQUES TO MANAGE COMMUNICATION RATES IN A WIRELESS NETWORK

(75) Inventor: Shai Waxman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 972 days.

(21) Appl. No.: 11/026,007

(22) Filed: Dec. 31, 2004

(65) Prior Publication Data

US 2006/0146705 A1 Jul. 6, 2006

(51) Int. Cl.
*H04W 4/00* (2009.01)
(52) U.S. Cl. .................. 370/338; 370/231; 455/452.1
(58) Field of Classification Search .............. 370/230, 370/230.1, 235, 236, 470, 476, 338, 336, 370/349, 231; 455/452.1, 501, 522
See application file for complete search history.

(56) References Cited

U.S. PATENT DOCUMENTS

| | | | | |
|---|---|---|---|---|
| 6,473,399 | B1 * | 10/2002 | Johansson et al. | 370/229 |
| 7,136,353 | B2 * | 11/2006 | Ha et al. | 370/230 |
| 7,301,965 | B2 * | 11/2007 | Cimini et al. | 370/470 |
| 2002/0037000 | A1 * | 3/2002 | Park et al. | 370/349 |
| 2003/0067890 | A1 * | 4/2003 | Goel et al. | 370/310.1 |
| 2004/0117497 | A1 * | 6/2004 | Park | 709/230 |
| 2004/0120292 | A1 * | 6/2004 | Trainin | 370/338 |
| 2004/0184437 | A1 * | 9/2004 | Lee et al. | 370/349 |
| 2004/0218630 | A1 * | 11/2004 | An | 370/470 |
| 2005/0094607 | A1 * | 5/2005 | Zaki et al. | 370/338 |
| 2005/0141545 | A1 * | 6/2005 | Fein et al. | 370/445 |
| 2005/0157696 | A1 * | 7/2005 | Yamamoto | 370/349 |
| 2006/0056362 | A1 * | 3/2006 | Jang et al. | 370/336 |
| 2006/0126513 | A1 * | 6/2006 | Li et al. | 370/236 |

* cited by examiner

*Primary Examiner* — Aung S Moe
*Assistant Examiner* — Awet Haile
(74) *Attorney, Agent, or Firm* — Kacvinsky Daisak PLLC

(57) ABSTRACT

System, apparatus, and method to manage data communication rates in a wireless network are described. In an embodiment, a system may include multiple antennas, multiple transceivers to connect to the multiple antennas; and a media access controller to connect to the transceivers. The media access controller may send a first physical protocol data unit having a first number of media access control protocol data units using the transceivers. The media access controller may receive an acknowledgement message to indicate a second number of media access control protocol data units received from the first physical protocol data unit. The media access controller may select a third number of media access control protocol data units for a second physical protocol data unit using the second number.

16 Claims, 4 Drawing Sheets

TECHNIQUES TO MANAGE COMMUNICATION RATES IN A WIRELESS NETWORK

BACKGROUND

In a wireless communication system, wireless communication devices may communicate information using different data communication rates. In some instances, it may be necessary to adapt the data communication rate for a system based on environmental conditions, such as interference, noise, transceiver impairments, and so forth. This may be referred to as rate adaptation. Rate adaptation may have a significant affect on the overall throughput for a communication system. Consequently, techniques to improve rate adaptation may improve the overall performance of a device or system.

DETAILED DESCRIPTION

Figure 1:
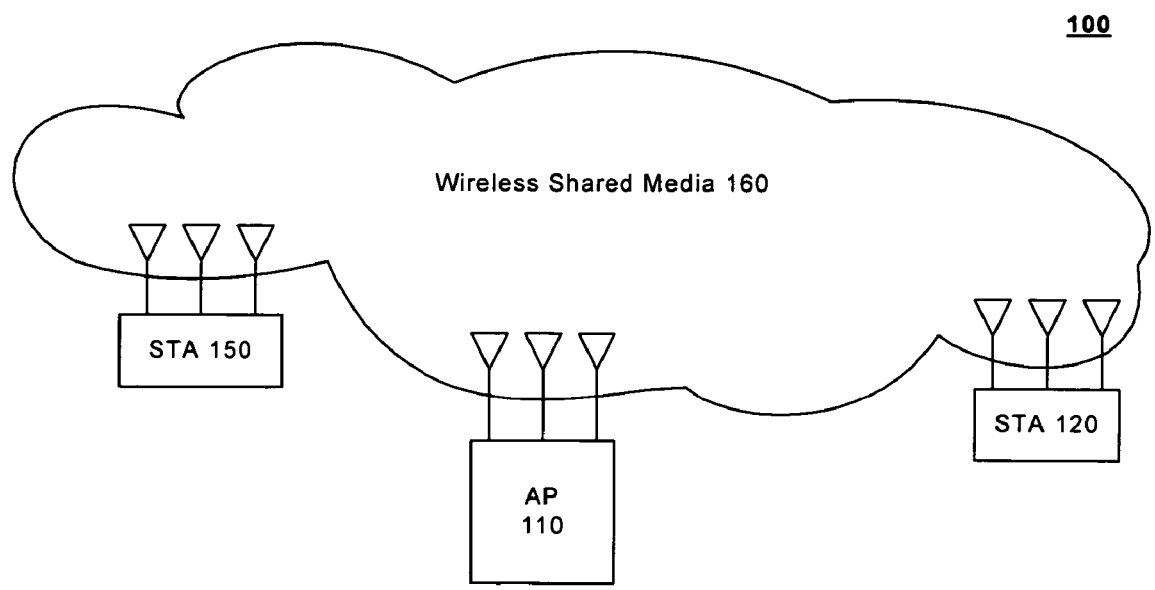
FIG. 1 illustrates a block diagram of a system 100.

FIG. 1 illustrates a block diagram of a system 100. System 100 may comprise, for example, a communication system having multiple nodes. A node may comprise any physical or logical entity having a unique address in system 100. Examples of a node may include, but are not necessarily limited to, a computer, server, workstation, laptop, ultra-laptop, handheld computer, telephone, cellular telephone, personal digital assistant (PDA), router, switch, bridge, hub, gateway, wireless access point, and so forth. The unique address may comprise, for example, a network address such as an Internet Protocol (IP) address, a device address such as a Media Access Control (MAC) address, and so forth. The embodiments are not limited in this context.

The nodes of system 100 may be arranged to communicate different types of information, such as media information and control information. Media information may refer to any data representing content meant for a user, such as voice information, video information, audio information, numerical information, text information, alphanumeric symbols, graphics, images, and so forth. Control information may refer to any data representing commands, instructions or control words meant for an automated system. For example, control information may be used to route media information through a system, or instruct a node to process the media information in a predetermined manner.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, system 100 may operate in accordance with the IEEE 802.11 wireless local area network (WLAN) series of standard protocols, such as the IEEE 802.11 standard entitled Supplement to IEEE Standard for Information Technology-Telecommunications and Information Exchange Between Systems-Local Metropolitan Area Networks-Specific Requirements-Part 11: Wireless LAN Medium Access Control (MAC) and Physical Layer (PHY) Specifications, 1999, the IEEE standard 802.11 a entitled High Speed Physical Layer in the 5 GHz Band, February 2000, and IEEE standard 802.11 g entitled Further Higher Data Rate Extension in the 2.4 GHz Band, September 2000, the IEEE 802.11 n proposed standard, 2004 ("802.11 n Proposed Standard"). In another example, system 100 may operate in accordance with the IEEE 802.16 and 802.20 series of standard protocols as well. The embodiments are not limited in this context.

Referring again to FIG. 1, system 100 may comprise a wireless communication system. Wireless communication system 100 may include one or more wireless nodes arranged to communicate information over one or more types of wireless communication media. An example of a wireless communication media may include portions of a wireless spectrum, such as the radio-frequency (RF) spectrum. The wireless nodes may include components and interfaces suitable for communicating information signals over the designated wireless spectrum, such as one or more antennas, wireless transmitters/receivers ("transceivers"), amplifiers, filters, control logic, and so forth. The embodiments are not limited in this context.

In one embodiment, system 100 may comprise a wireless communication system operating in accordance with, for example, the IEEE 802.11 series of protocols. System 100 may include multiple nodes, such as nodes 110, 120, and 150, all arranged to communicate information signals using wireless shared media 160. Information signals may include any type of signal encoded with information, such as media and/or control information. Although FIG. 1 is shown with a limited number of nodes in a certain topology, it may be appreciated that system 100 may include more or less nodes in any type of topology as desired for a given implementation. The embodiments are not limited in this context.

In one embodiment, for example, node 110 may comprise an access point (AP). AP 110 may comprise a wireless access point for a network, such as a WLAN. In one embodiment, for example, AP 110 may be implemented as a high throughput (HT) wireless device arranged to operate in accordance with the IEEE-802.11 n Proposed Standard. AP 110 may include a MIMO system having multiple transceivers and multiple antennas. The embodiments are not limited in this context.

In one embodiment, for example, nodes 120, 150 may comprise mobile devices. Examples of mobile devices may include a computer, laptop computer, ultra-laptop computer, handheld computer, cellular telephone, personal digital assistant (PDA), wireless PDA, combination cellular telephone/PDA, portable digital music player, pager, two-way pager, station, mobile subscriber station, and so forth. In one embodiment, for example, nodes 120 and 150 may comprise stations (STA) for an 802.11 WLAN. The embodiments, however, are not limited in this context.

In one embodiment, for example, STA 120, 150 may be implemented as HT wireless devices arranged to operate in accordance with the IEEE-802.11 n Proposed Standard. STA 120, 150 may each include a MIMO system having at least two transceivers and two antennas. The MIMO system, however, may have any number of transceivers and antennas, and the embodiments are not limited in this context.

In general operation, the nodes of system 100 may operate in multiple operating modes. For example, STA 120, 150 and AP 110 may operate in at least one of the following operating modes: a single-input-single-output (SISO) mode, a multiple-input-single-output (MISO) mode, a single-input-multiple-output (SIMO) mode, and/or in a MIMO mode. In a SISO operating mode, a single transmitter and a single receiver may be used to communicate information signals over a wireless shared medium 160. In a MISO operating mode, two or more transmitters may transmit information signals over wireless shared media 160, and information signals may be received from wireless shared media 160 by a single receiver of a MIMO system. In a SIMO operating mode, one transmitter and two or more receivers may be used to communicate information signals over wireless shared media 160. In a MIMO operating mode, two or more transmitters and two or more receivers may be used to communicate information signals over wireless shared media 160.

In one embodiment, AP 110 and STA 120, 150 may communicate information using a number of different data transmission rates. For example, the IEEE 802.11n Proposed Standard allows data transmission rates of approximately 6 Megabits-per-second (Mbps) to 300 Mbps. The particular data transmission rate used by system 100 may vary depending on certain environmental conditions, such as interference, noise on the communication channel, transceiver impairments, and so forth. Generally, the higher the data transmission rate, the more susceptible the system may be to errors. Such environmental conditions may therefore necessitate operation of system 100 at a lower data transmission rate. The technique of modifying the data transmission rate for a system is typically referred to as "rate adaptation."

Rate adaptation in a wireless communication system operating in accordance with the IEEE 802.11 standards generally takes place in the transmitter at the MAC level. Conventional rate adaptation techniques typically rely on information acquired through acknowledgment messages received after each correctly transmitted data packet. For example, an acknowledgment message may indicate a correctly received packet, while an absence of an acknowledgment message may generally be interpreted as an error. A determination to modify the data rate in the transmitter can be made by analyzing acknowledgement patterns. After a certain number of correctly received data packets, the transmitter may attempt to switch to a higher data transmission rate. Similarly, after a certain number of consecutive errors, the transmitter may attempt to switch to a lower data transmission rate.

Conventional rate adaptation techniques, however, may be unsatisfactory for a number of reasons. For example, simply using received acknowledgments may often cause adaptation of the data transmission rate of the transmitter to a value that is either too high or too low. This may have an undesirably impact on the throughput of the system. For example, switching to a lower data rate when a higher rate can potentially be supported by the system may result in a significant degradation of throughput. The same may be true when switching to a higher data rate than the system can support, thus resulting in a high packet error rate (PER), bit error rate (BER), or frame error rate (FER).

Some embodiments may solve these and other problems. In one embodiment, for example, a node such as AP 110 may perform rate adaptation by modifying a length for a packet in accordance with a given data communication rate. For example, AP 110 may send a first set of one or more packets to a station, such as STA 120 and/or 150. When the station responds with an acknowledgement message, AP 110 may determine a number of packets received by the receiving station. AP 110 may use the number to adjust a length for a second set of packets that is appropriate for a given data communication rate. By factoring length into the rate adaptation algorithm, AP 110 may converge to a solution that provides a potentially higher throughput than adjusting only the data communication rate. In some embodiments, for example, the overall throughput may be increased by approximately 20% or more by selecting the appropriate packet length. The embodiments are not limited in this context.

Figure 2:
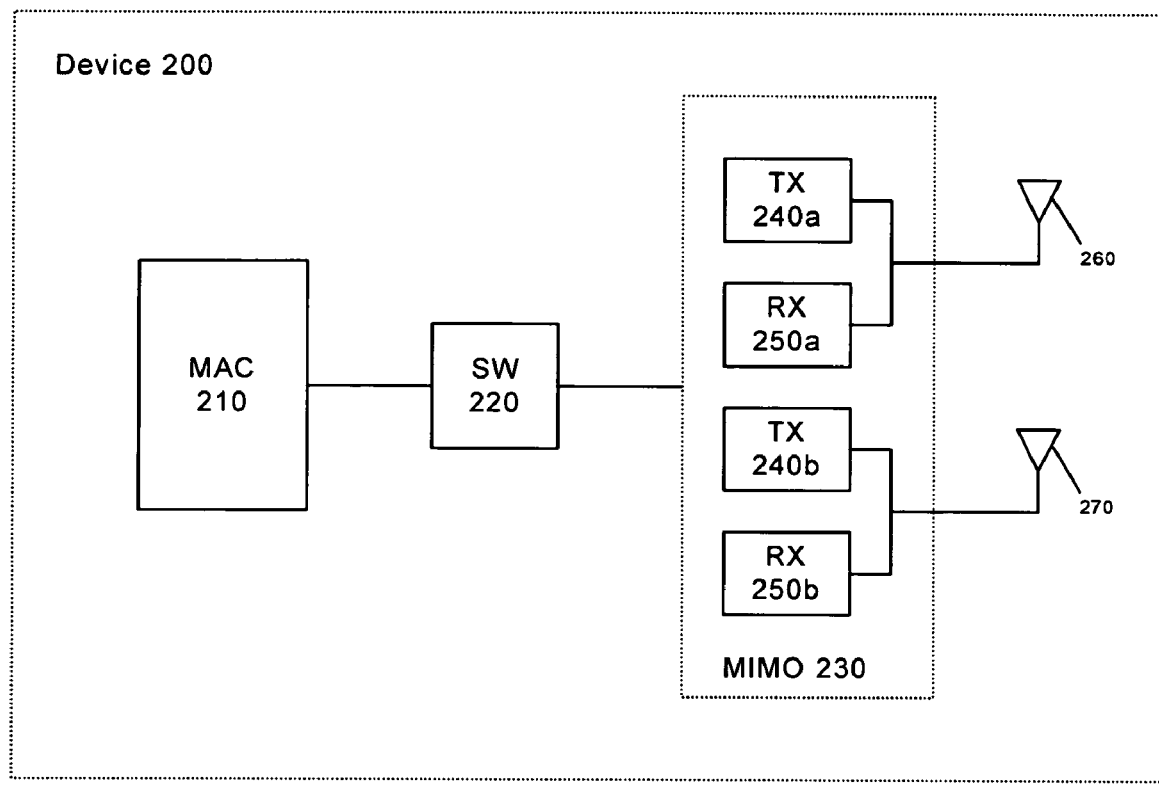
FIG. 2 illustrates a partial block diagram of a node 200.

FIG. 2 illustrates a partial block diagram of a node 200. Node 200 may be implemented as part of AP 110, STA 120 and/or STA 150 as described with reference to FIG. 1. As shown in FIG. 2, node 200 may comprise multiple elements, such as processor 210, switch (SW) 220, and a transceiver array 230. Some elements may be implemented using, for example, one or more circuits, components, registers, processors, software subroutines, or any combination thereof. Although FIG. 2 shows a limited number of elements, it can be appreciated that more or less elements may be used in node 200 as desired for a given implementation. The embodiments are not limited in this context.

In one embodiment, node 200 may include a transceiver array 230. Transceiver array 230 may be implemented as, for example, a MIMO system. MIMO system 230 may include two transmitters 240a and 240b, and two receivers 250a and 250b. Although MIMO system 230 is shown with a limited number of transmitters and receivers, it may be appreciated that MIMO system 230 may include any desired number of transmitters and receivers. The embodiments are not limited in this context.

In one embodiment, transmitters 240a-b and receivers 250a-b of MIMO system 230 may be implemented as OFDM transmitters and receivers. Transmitters 240a-b and receivers 250a-b may communicate data frames with other wireless devices. For example, when implemented as part of AP 110, transmitters 240a-b and receivers 250a-b may communicate data frames with STA 120 and STA 150. When implemented as part of STA 120 and/or STA 150, transmitters 240a-b and receivers 250a-b may communicate data frames with AP 110. The data frames may be modulated in accordance with a number of modulation schemes, to include Binary Phase Shift Keying (BPSK), Quadrature Phase-Shift Keying (QPSK), Quadrature Amplitude Modulation (QAM), 16-QAM, 64-QAM, and so forth. The embodiments are not limited in this context.

In one embodiment, transmitter 240a and receiver 250a may be operably coupled to an antenna 260, and transmitter 240b and receiver 250b may be operably coupled to antenna 270. Examples for antenna 260 and/or antenna 270 may include an internal antenna, an omni-directional antenna, a monopole antenna, a dipole antenna, an end fed antenna or a circularly polarized antenna, a micro-strip antenna, a diversity antenna, a dual antenna, an antenna array, and so forth. The embodiments are not limited in this context.

In one embodiment, node 200 may include SW 220. SW 220 may be connected to transceiver array 230. SW 220 may be used to switch transceiver array 230 between various operating modes, such as SISO, MISO, SIMO and MIMO, as previously described. The embodiments are not limited in this context.

In one embodiment, node 200 may include a processor 210. Processor 210 may be connected to SW 220 and/or transceiver array 230. Processor 210 may be implemented as a general purpose processor, such as a processor made by Intel® Corporation, for example. Processor 210 may also comprise a dedicated processor, such as a controller, microcontroller, embedded processor, a digital signal processor (DSP), a network processor, an input/output (I/O) processor, and so forth. The embodiments are not limited in this context.

In one embodiment, processor 210 may include, or have access to, a memory unit (not shown). The memory unit may comprise any machine-readable media. Some examples of machine-readable media include, but are not necessarily limited to, read-only memory (ROM), random-access memory (RAM), dynamic RAM (DRAM), double-data-rate DRAM (DDRAM), synchronous RAM (SRAM) or DRAM (SDRAM), programmable ROM, erasable programmable ROM, electronically erasable programmable ROM, flash memory, a polymer memory such as ferroelectric polymer memory, an ovonic memory, and so forth. The embodiments are not limited in this context.

In one embodiment, for example, processor 210 may be arranged to perform MAC layer operations. For example, processor 210 may be implemented as a MAC processor. MAC 210 may be arranged to perform MAC layer processing operations. In addition, MAC 210 may be arranged to manage rate adaptation in a wireless system operating in accordance with one or more protocols that use acknowledgements to confirm receipt of information, such as the IEEE 802.11 series of protocols, particularly the IEEE 802.11 n Proposed Standard, for example. The embodiments, however, are not limited in this context.

When implemented in a node of system 100, node 200 may be arranged to communicate information over wireless communications media between the various nodes, such as AP 110, STA 120 and STA 150. The information may be communicated using in the form of packets, with each packet comprising media information and/or control information. The media and/or control information may be represented using, for example, multiple Orthogonal Frequency Division Multiplexing (OFDM) symbols. A packet in this context may refer to any discrete set of information, including a unit, frame, cell, segment, fragment, and so forth. The packet may be of any size suitable for a given implementation. In one embodiment, for example, the packet may comprise a media access control protocol data unit (MPDU) as defined by the IEEE 802.11 n Proposed Standard. The embodiments are not limited in this context.

In order to improve transfer efficiency, a transmitting device may transmit information in accordance with an aggregate exchange technique, such as defined by the IEEE 802.11 n Proposed Standard. For example, multiple MPDUs may be aggregated into a single physical (PHY) protocol data unit (PPDU), as defined by the IEEE 802.11n Proposed Standard. The PPDU may include a block acknowledgement request (BAR). The BAR may indicate the end of a PPDU. When a receiving device receives the PPDU, it waits to receive the BAR. Once the BAR is received, the receiving device may acknowledge receipt of the PPDU using a block acknowledgement (ACK) in response to the BAR. In this manner, the transmitting device may not necessarily need to initiate a new transfer for every single MPDU, thereby potentially increasing transfer efficiency and throughput.

Some embodiments may perform rate adaptation for system 100 using a test packet and corresponding block acknowledgement. For example, the test packet may comprise a packet, a series of packets, a PPDU, a Physical Layer Convergence Protocol (PLCP) Service Data Unit (PSDU), and so forth. In one embodiment, for example, the test packet may comprise a PPDU. The embodiments, however, are not limited in this context.

In an 802.1 n system, there may be a need for an efficient rate scaling mechanism that will both converge rapidly & reach maximal throughput when required. This may be accomplished using both maximal rate & maximal PPDU length. The following metrics may be used to quantify the throughput as a function of rate & length, as shown in Equation (1) as follows:

Throughput=Efficiency(RATE)*RATE=LENGTH (RATE)/(LENGTH(RATE)+overhead)*RATE,  Equation (1)

where LENGTH (RATE) is defined as the maximal packet length converted to the time domain (e.g., micro-seconds (µs)) that can be sent reliably for a given PER. For example, a typical PER for system 100 may comprise a PER of less than, or equal to, 10%. The maximal packet length is typically limited by channel coherence time, and in a MIMO system the maximal packet length can be relatively short.

The following examples may be used to demonstrate the throughput as a function of rate & length in accordance with Equation (1). Assume that the overhead of a typical 802.11a/g data packet is approximately 182 µs per packet. The overhead of 182 µs may be calculated using the following elements: DIFS (e.g., 34 µs)+average back off (e.g., 68 µs)+header (e.g., 20 µs)+SIFS (e.g., 16 µs)+ACK (e.g., 44 µs). One potential maximal efficiency you get when transmitting a packet with 3 µs duration is approximately 94% (e.g., 3/3.182=94%). This may represent the approximate efficiency when transmitting 2320 bytes at the relatively low rate of 6 Mbps. By using an aggregation technique such as defined in the 802.11 n Proposed Standard, similar efficiencies may potentially be gained at higher data communication rates, including the data communication rates typically associated with MIMO techniques. Compare this with a packet having a length of 2320 bytes that was transmitted at a data communication rate of approximately 108 Mbps. The throughput efficiency in this case would be approximately only 65% (e.g., 0.34/(0.34+ 0.182)=65%). Consequently, the potential improvement of aggregation is approximately 30% or greater. Accordingly, if a MIMO system uses aggregated packets having a maximum length of approximately 8000 bytes, the resulting throughput efficiency could be as high as 86% or greater. This may represent a potential 10% or greater improvement over conventional techniques. It may be appreciated that these values are given by way of example only, and the embodiments are not limited in this context.

During transmission, when picking a higher data transmission rate or lower data transmission rate than the current data transmission rate, AP 302 may transmit an aggregated packet of a maximum packet length for a given protocol or standard. For example, the maximal packet length for the 802.11a standard is 2320 bytes. The maximal packet length may be set to 2320 bytes to limit transmission time to approximately 1 milli-second (ms) at the lowest data communication rate for an 802.11a system, which is approximately 6 Mbps. In an 802.11 n system, the maximal packet length may vary, but is typically on the order of approximately 8000 bytes, for example. The aggregated packet may be sent x times, where x is a positive integer. For example, x may equal 1 for a typical implementation. The maximal packet length and sent times may vary according to a given implementation, and the embodiments are not limited in this context.

A coherence time may be estimated by analyzing the block ACK pattern sent in response to the aggregated packet to find the first MPDU that was not properly received. Alternatively, other statistical techniques to determine a coherence time may also be used as well. Once the coherence time is estimated, the LENGTH(RATE) may be set to the coherence time. The packet length and/or data communication rate which maximizes the throughput formula above may be selected by the transmitting device. A higher rate relative to conventional techniques will usually be selected unless the coherence time/efficiency is extremely small. Rate adaptation using this technique may be described in more detail with reference to FIGS. 3-4.

Figure 3:
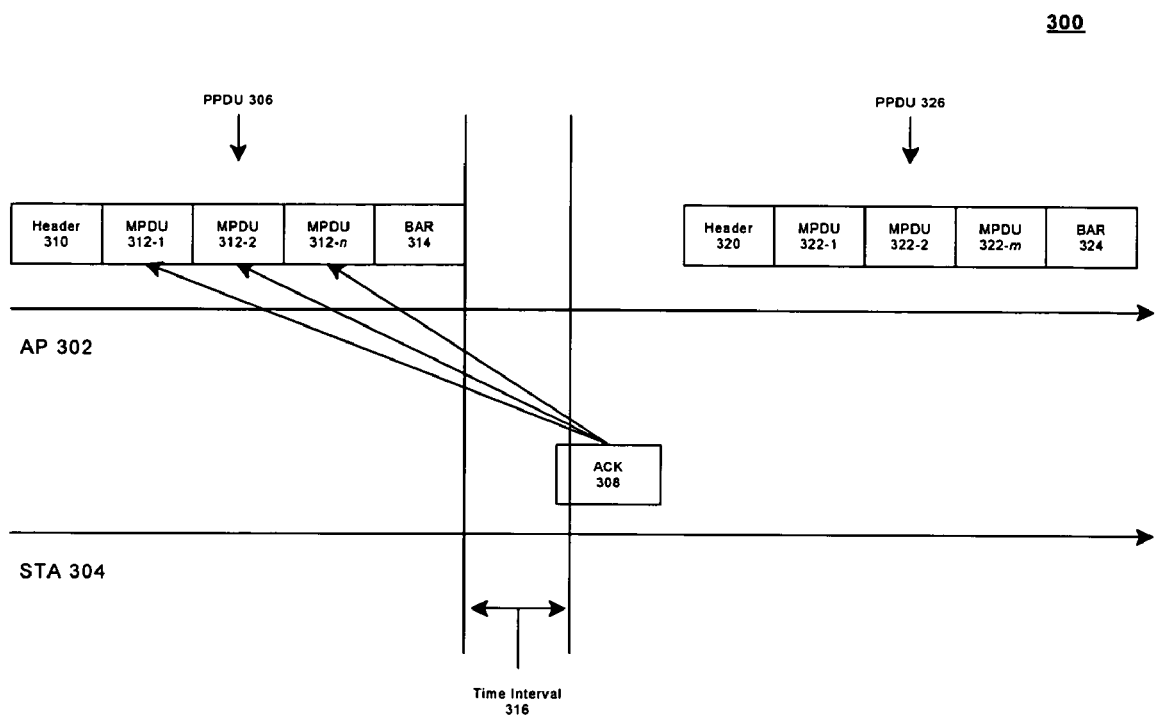
FIG. 3 illustrates a timing diagram 300.

FIG. 3 illustrates a timing diagram 300. Timing diagram 300 may illustrate the communication of information between an AP 302 and STA 304. AP 302 may be representative of, for example, AP 110. STA 304 may be representative of, for example, STA 120 and/or 150. Each of AP 302 and STA 304 may be implemented using node 200. The embodiments are not limited in this context.

On the transmit side, AP 302 may transmit or send information to STA 304. The information may include media and/or control information represented using, for example, multiple OFDM symbols. The information may be communicated using a PPDU 306. PPDU 306 may comprise, for example, a PPDU header 310 and a BAR 314. PPDU 306 may further comprise multiple MPDU 312-1-$n$, where n is any positive integer. The value of n may be set in accordance with a total aggregation size for PPDU 306 desired for a given implementation. The embodiments are not limited in this context.

Once AP 302 sends PPDU 306 to STA 304, AP 302 waits to receive a block ACK 308 from STA 304. Block ACK 308 may indicate whether STA 304 has successfully received PPDU 306. More particularly, block ACK 308 may indicate which of MPDU 312-1-$n$ have been properly received by STA 304. Block ACK 308 may include individual acknowledgement values for each MPDU 312-1-$n$. MAC 210 of STA 304 may set each individual acknowledgement value to indicate whether a corresponding MPDU 312-1-$n$ has been properly received. For example, MAC 210 may set the individual acknowledgement value to one ("1") to indicate that the corresponding MPDU was properly received, and to zero ("0") to indicate that the corresponding MPDU was not properly received, or vice-versa. STA 304 may send block ACK 308 with the set individual acknowledgement values to AP 302 via transmitters 240$a$-$b$.

AP 302 may wait for block ACK 308 for a given delay interval. Once AP 302 sends PPDU 306 to STA 304, AP 302 may start a transmit timer to monitor when the delay interval is to expire. The delay interval may comprise any determined amount or interval of time, as represented by time interval 316. In one embodiment, for example, time interval 316 may comprise a short interframe spacing (SIFS) time as defined by the IEEE 802.11a specification, which is approximately 16 microseconds (μs). It is worthy to note, however, that a particular implementation of a SIFS time may have a variable duration depending upon, for example, an error tolerance range of a given standard. For example, the 802.11 MAC standards may allow for an error within +/−10% of a slot time. Further, the slot time for a given standard may vary as well. Accordingly, time interval 316 may vary according to a given implementation. The embodiments are not limited in this context.

If AP 302 fails to receive block ACK 308 within time interval 316, AP 302 assumes PPDU 306 has not been properly received by STA 304. Consequently, AP 302 may then retransmit the entire PPDU 306 to STA 304, typically at a lower data transmission rate. AP 302 may continue such retransmission operations until a terminating event occurs. Examples of terminating events may include receiving block ACK 308 for PPDU 306, determining that a set number of retransmissions of PPDU 306 have occurred, receiving an explicit termination signal, and so forth. The embodiments are not limited in this context.

If AP 302 receives block ACK 308 within time interval 316, AP 302 may use block ACK 308 to determine a number of MPDU 312-1-$n$ that have been properly received by STA 304. For example, assume each MPDU 312 has a fixed packet length, and PPDU 306 included a maximum packet length of approximately seven MPDU, such as MPDU 312-1-7. Further assume that STA 304 receives only four MPDU (e.g., MPDU 312-1-4) of PPDU 306. STA 304 may send block ACK 308 with the individual acknowledgement values for MPDU 312-1-4 set to 1 to indicate that the corresponding MPDU have been successfully received. AP 302 may receive block ACK 308, and determine that MPDU 312-1-4 have been properly received using the individual acknowledgement values.

Once AP 302 receives block ACK 308 and determines a number of MPDU that were properly received, AP 302 may adjust a packet length for subsequent packets, such as PPDU 326. MAC 210 may adjust the packet length for PPDU 326 using the number of MPDU 312-1-$n$ from PPDU 306 successfully received by STA 304 as indicated by block ACK 308, and the output of Equation (1). MAC 210 may adjust a length for PPDU 326 by selecting a number of MPDU 322-1-$m$ for PPDU 326 using the number of correctly received MPDU 312-1-$n$ from PPDU 306. Referring to the previous example, assume that MPDU 312-1-4 of PPDU 306 have been properly received as indicated by block ACK 308. MAC 210 may select four MPDU 322-1-4 (e.g., m=4) for PPDU 326. AP 302 may send PPDU 326 with MPDU 322-1-4, thereby potentially improving throughput for system 100.

In one embodiment, PPDU 326 may be sent at the same data communication rate used for PPDU 306. For example, if PPDU 306 is sent at 100 Mbps, PPDU 326 may also be send at 100 Mbps. Since PPDU 326 has fewer MPDU 322-1-$m$ than PPDU 306, however, the overall throughput for system 100 may increase. Alternatively, a new data communication rate suitable for the adjusted packet length of PPDU 326 may be selected using Equation (1) as previously described. The embodiments are not limited in this context.

On the receive side, STA 304 may begin receiving PPDU 306 via receivers 250$a$-$b$ of transceiver array 230. If STA 304 completely receives PPDU 306 as indicated by BAR 314 of PPDU 306 within time interval 316, MAC 210 of STA 304 may send block ACK 308 via transmitters 240$a$-$b$ of transceiver array 230 to AP 302. AP 302 may perform retransmission operations in accordance with block ACK 308 as previously described. If STA 304 completely receives PPDU 326, STA 304 may send another block ACK (not shown) to confirm that the new data communication rate and/or packet length is acceptable for operation of system 100.

Operations for the above embodiments may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 4:
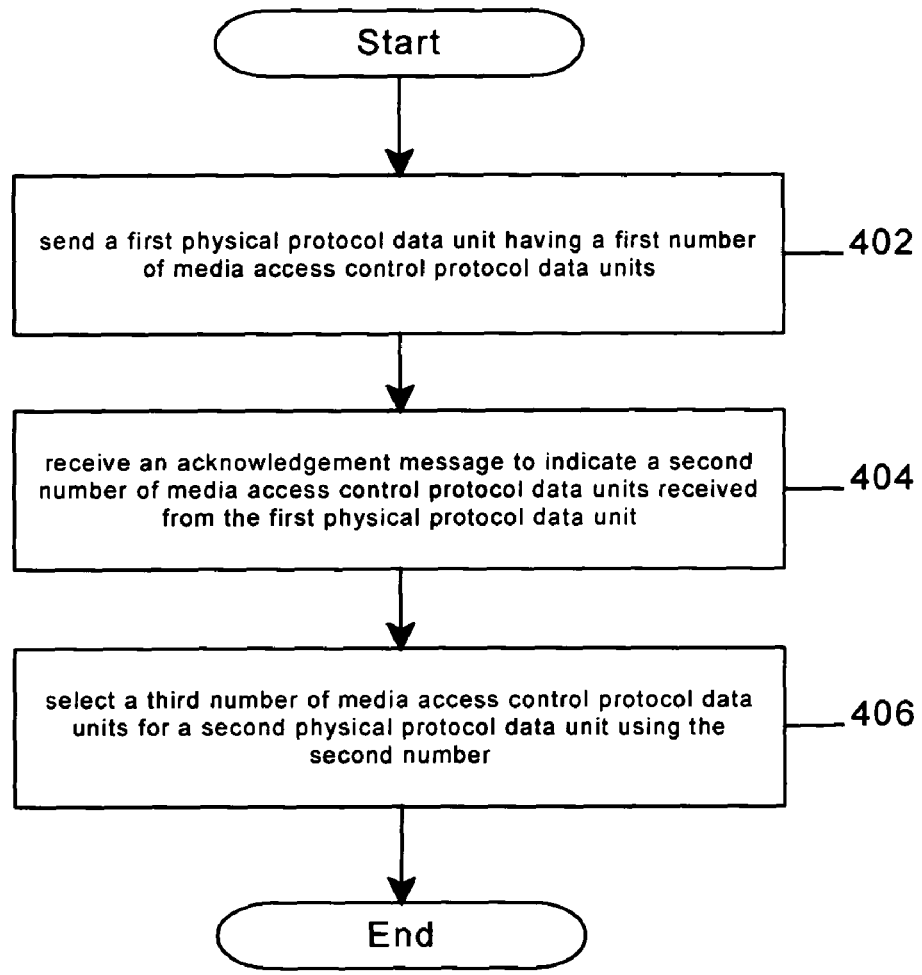
FIG. 4 illustrates a programming logic 400.

FIG. 4 illustrates a programming logic 400. Programming logic 400 may be representative of the operations executed by one or more systems described herein, such as node 200 as implemented as part of AP 302, for example. As shown in programming logic 400, a first PPDU having a first number of MPDU may be sent at block 402. For example, the first number may comprise a maximum number of MPDU for a given packet error rate. In another example, a length for each media access control protocol data unit may be defined. An acknowledgement message to indicate a second number of MPDU received from the first PPDU may be received at block 404. A third number of MPDU for a second PPDU may be selected using the second number at block 406.

In one embodiment, the second PPDU may be sent using a data communication rate approximately matching a data communication rate used for the first PPDU. Alternatively, the second PPDU may be sent using a data communication rate different from a data communication rate used for the first PPDU. The embodiments are not limited in this context.

In one embodiment, the third number of MPDU for the second PPDU may be selected using the second number and/or a data communication rate. The embodiments are not limited in this context.

It should be understood that the embodiments may be used in a variety of applications. As described above, the circuits and techniques disclosed herein may be used in many apparatuses such as transmitters and receivers of a radio system. Transmitters and/or receivers intended to be included within the scope of the embodiments may include, by way of example only, WLAN transmitters and/or receivers, MIMO transmitters-receivers system, two-way radio transmitters and/or receivers, digital system transmitters and/or receivers, analog system transmitters and/or receivers, cellular radio-telephone transmitters and/or receivers, and so forth. The embodiments are not limited in this context.

Types of WLAN transmitters and/or receivers intended to be within the scope of the embodiments may include, although are not limited to, transmitters and/or receivers for transmitting and/or receiving spread spectrum signals such as, for example, Frequency Hopping Spread Spectrum (FHSS), Direct Sequence Spread Spectrum (DSSS) OFDM transmitters and/or receivers, and so forth. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
    a transceiver; and
    a media access controller to connect to said transceiver, said media access controller to send a first physical protocol data unit having a first number of media access control protocol data units using said transceiver, said first number comprises a maximum number of media access control protocol data units for a given packet error rate, receive a first acknowledgement message to indicate a second number of media access control protocol data units received from said first physical protocol data unit, estimate a coherence time using the first acknowledgement message, select a data communication rate based on the estimated coherence time, adjust a length of a second physical protocol data unit by selecting a third number of media access control protocol data units for the second physical protocol data unit using said second number and said data communication rate and receive a second acknowledgement message to confirm acceptance of the data communication rate of the second physical protocol data unit.

2. The apparatus of claim 1, wherein said first physical protocol data unit is sent using said data communication rate, and said second physical protocol data unit is sent using said transceiver at said data communication rate.

3. The apparatus of claim 1, wherein said first physical protocol data unit is sent using a first data communication rate, and said second physical protocol data unit is sent using said transceiver at a second data communication rate.

4. The apparatus of claim 1, wherein a length for each media access control protocol data unit is defined.

5. The apparatus of claim 1, wherein each media access control protocol data unit includes orthogonal frequency division multiplexing symbols.

6. A system, comprising:
multiple antennas;
multiple transceivers to connect to said multiple antennas; and
a media access controller to connect to said transceivers, said media access controller to send a first physical protocol data unit having a first number of media access control protocol data units using said transceivers, said first number comprises a maximum number of media access control protocol data units for a given packet error rate, receive a first acknowledgement message to indicate a second number of media access control protocol data units received from said first physical protocol data unit, estimate a coherence time using the first acknowledgement message, select a data communication rate based on the estimated coherence time, adjust a length of a second physical protocol data unit by selecting a third number of media access control protocol data units for the second physical protocol data unit using said second number and said data communication rate and receive a second acknowledgement message to confirm acceptance of the data communication rate of the second physical protocol data unit.

7. The system of claim 6, wherein said first physical protocol data unit is sent using said data communication rate, and said second physical protocol data unit is sent using said transceiver at said data communication rate.

8. The system of claim 6, wherein said first physical protocol data unit is sent using a first data communication rate, and said second physical protocol data unit is sent using said transceiver at a second data communication rate.

9. The system of claim 6, wherein a length for each media access control protocol data unit is defined.

10. The system of claim 6, wherein each media access control protocol data unit includes orthogonal frequency division multiplexing symbols.

11. A method, comprising:
sending a first physical protocol data unit having a first number of media access control protocol data units, said first number comprises a maximum number of media access control protocol data units for a given packet error rate;
receiving a first acknowledgement message to indicate a second number of media access control protocol data units received from said first physical protocol data unit;
estimating a coherence time using the first acknowledgement message;
selecting a data communication rate based on the estimated coherence time; and
adjusting a length of a second physical protocol data unit by selecting a third number of media access control protocol data units for the second physical protocol data unit using said second number and said data communication rate; and
receiving a second acknowledgement message to confirm acceptance of the data communication rate of the second physical protocol data unit.

12. The method of claim 11, further comprising sending said second physical protocol data unit using a data communication rate approximately matching a data communication rate used for said first physical protocol data unit.

13. The method of claim 11, wherein a length for each media access control protocol data unit is defined.

14. An article comprising a non transitory computer-readable storage medium containing instructions that if executed enable a system to send a first physical protocol data unit having a first number of media access control protocol data units, said first number comprises a maximum number of media access control protocol data units for a given packet error rate, receive a first acknowledgement message to indicate a second number of media access control protocol data units received from said first physical protocol data unit, estimate a coherence time using the first acknowledgement message; select a data communication rate based on the estimated coherence time; adjust a length of a second physical protocol data unit by selecting a third number of media access control protocol data units for the second physical protocol data unit using said second number and said data communication rate and receive a second acknowledgement message to confirm acceptance of the data communication rate of the second physical protocol data unit.

15. The article of claim 14, further comprising instructions that if executed enable the system to send said second physical protocol data unit using said data communication rate approximately matching a data communication rate used for said first physical protocol data unit.

16. The article of claim 14, wherein a length for each media access control protocol data unit is defined.

* * * * *